United States Patent
Wu et al.

(10) Patent No.: US 8,417,026 B2
(45) Date of Patent: Apr. 9, 2013

(54) GESTURE RECOGNITION METHODS AND SYSTEMS

(75) Inventors: Cheng-Feng Wu, Chiayi County (TW); Cheng-Yuan Tang, Taipei County (TW); Shih-Pin Chao, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 434 days.

(21) Appl. No.: 12/813,464

(22) Filed: Jun. 10, 2010

(65) Prior Publication Data

US 2011/0156999 A1    Jun. 30, 2011

(30) Foreign Application Priority Data

Dec. 30, 2009   (TW) ................................ 98145756 A

(51) Int. Cl.
*G06K 9/00*       (2006.01)
(52) U.S. Cl. ...................................................... 382/165
(58) Field of Classification Search .................. 382/103, 382/154, 165, 181, 190, 209; 345/156, 173, 345/175; 348/14.07–14.08, 155, 169; 340/5.1, 340/12.22, 539.22; 701/1, 2, 408; 707/999.001; 715/716, 719, 773, 863
See application file for complete search history.

(56) References Cited

U.S. PATENT DOCUMENTS

| | | | |
|---|---|---|---|
| 6,072,494 A * | 6/2000 | Nguyen ......................... | 715/863 |
| 6,075,895 A | 6/2000 | Qiao et al. | |
| 6,256,033 B1 | 7/2001 | Nguyen | |
| 6,804,396 B2 | 10/2004 | Higaki et al. | |
| 7,225,414 B1 * | 5/2007 | Sharma et al. ................. | 715/863 |
| 7,260,257 B2 * | 8/2007 | Zhang et al. ................... | 382/165 |
| 7,274,800 B2 * | 9/2007 | Nefian et al. .................. | 382/103 |
| 7,701,439 B2 * | 4/2010 | Hillis et al. .................... | 345/156 |
| 7,849,421 B2 * | 12/2010 | Yoo et al. ....................... | 715/863 |
| 8,139,110 B2 * | 3/2012 | Nishihara ...................... | 348/135 |

FOREIGN PATENT DOCUMENTS

| | | |
|---|---|---|
| CN | 1667641 A | 9/2005 |
| CN | 101437124 A | 5/2009 |

OTHER PUBLICATIONS

China Patent Office, Office Action, Patent Application Serial No. 201010105189.2, Jul. 23, 2012, China.

* cited by examiner

*Primary Examiner* — Jose Couso

(57) ABSTRACT

Gesture recognition methods and systems are provided. First, a plurality of gesture templates are provided, wherein each gesture template defines a first gesture characteristic and a corresponding specific gesture. Then, a plurality of images is obtained, and a multi-background model is generated accordingly. At least one object image is obtained according to the multi-background model, wherein the object image includes at least an object having a plurality of edges. The included angles of any two adjacent edges of the object image are gathered as statistics to obtain a second gesture characteristic corresponding to the object image. The second gesture characteristic of the object image is compared with the first gesture characteristic of each gesture template. The specific gesture corresponding to the first gesture characteristic is obtained, when the second gesture characteristic is similar to the first gesture characteristic.

16 Claims, 4 Drawing Sheets

GESTURE RECOGNITION METHODS AND SYSTEMS

CROSS REFERENCE TO RELATED APPLICATIONS

This Application claims priority of Taiwan Patent Application No. 098145756, filed on Dec. 30, 2009, the entirety of which is incorporated by reference herein.

BACKGROUND

1. Technical Field

The disclosure relates generally to gesture recognition methods and systems.

2. Description of the Related Art

With the popularization of electronic devices, such as computers and image capture devices, more and more applications and technology have been developed, making the devices even more convenient.

In some techniques, users can use a gesture to control operations of a computer. Generally, gesture recognition techniques can be classified into two types. In one type, a user must wear an appurtenance, such as a marking point apparatus or a glove for recognition assistance. In the other type, the user does not need to wear an appurtenance, and unarmed gesture recognition can be directly performed. The unarmed gesture recognition type is convenient and intuitive for users. However, when the obtained image for recognition includes a foreground and a background, lots of system resources are needed for gesture recognition, and recognition results, are often unsatisfactory.

Conventionally, in order to improve the performance and results of gesture recognition, a hand image can be obtained for subsequent gesture recognition according to a preset background model or by detecting a moved target from the image. However, once the background is changed, the accuracy of gesture recognition may be correspondingly affected. Additionally, gesture recognition detection, is dependent upon a hand that has moved.

SUMMARY

Gesture recognition methods and systems are provided.

In an embodiment of a gesture recognition method, a plurality of gesture templates are provided, wherein each gesture template defines a first gesture characteristic and a specific gesture corresponding to the first gesture characteristic. Then, a plurality of images is obtained, and a multi-background model is generated accordingly. At least one object image is obtained according to the multi-background model, wherein the object image includes at least an object having a plurality of edges. The included angles of any two adjacent edges of the object image are gathered as statistics to obtain a second gesture characteristic corresponding to the object image. The second gesture characteristic of the object image is compared with the first gesture characteristic of each gesture template. The specific gesture corresponding to the first gesture characteristic is obtained, when the second gesture characteristic is similar to the first gesture characteristic.

An embodiment of a gesture recognition system includes a storage unit and a processing unit. The storage unit stores a plurality of images and a plurality of gesture templates are provided, wherein each gesture template defines a first gesture characteristic and a specific gesture corresponding to the first gesture characteristic. The processing unit generates a multi-background model accordingly to the images, and obtains at least one object image according to the multi-background model, wherein the object image includes at least an object having a plurality of edges. The processing unit gathers statistics of included angles of any two adjacent edges of the object image to obtain a second gesture characteristic corresponding to the object image. The processing unit compares the second gesture characteristic of the object image with the first gesture characteristic of each gesture template. The specific gesture corresponding to the first gesture characteristic is obtained, when the second gesture characteristic is similar to the first gesture characteristic.

Gesture recognition methods may take the form of a program code embodied in a tangible media. When the program code is loaded into and executed by a machine, the machine becomes an apparatus for practicing the disclosed method.

BRIEF DESCRIPTION OF THE DRAWINGS

The disclosure will become more fully understood by referring to the following detailed description with reference to the accompanying drawings, wherein.

DETAILED DESCRIPTION

Gesture recognition methods and systems are provided.

Figure 1:
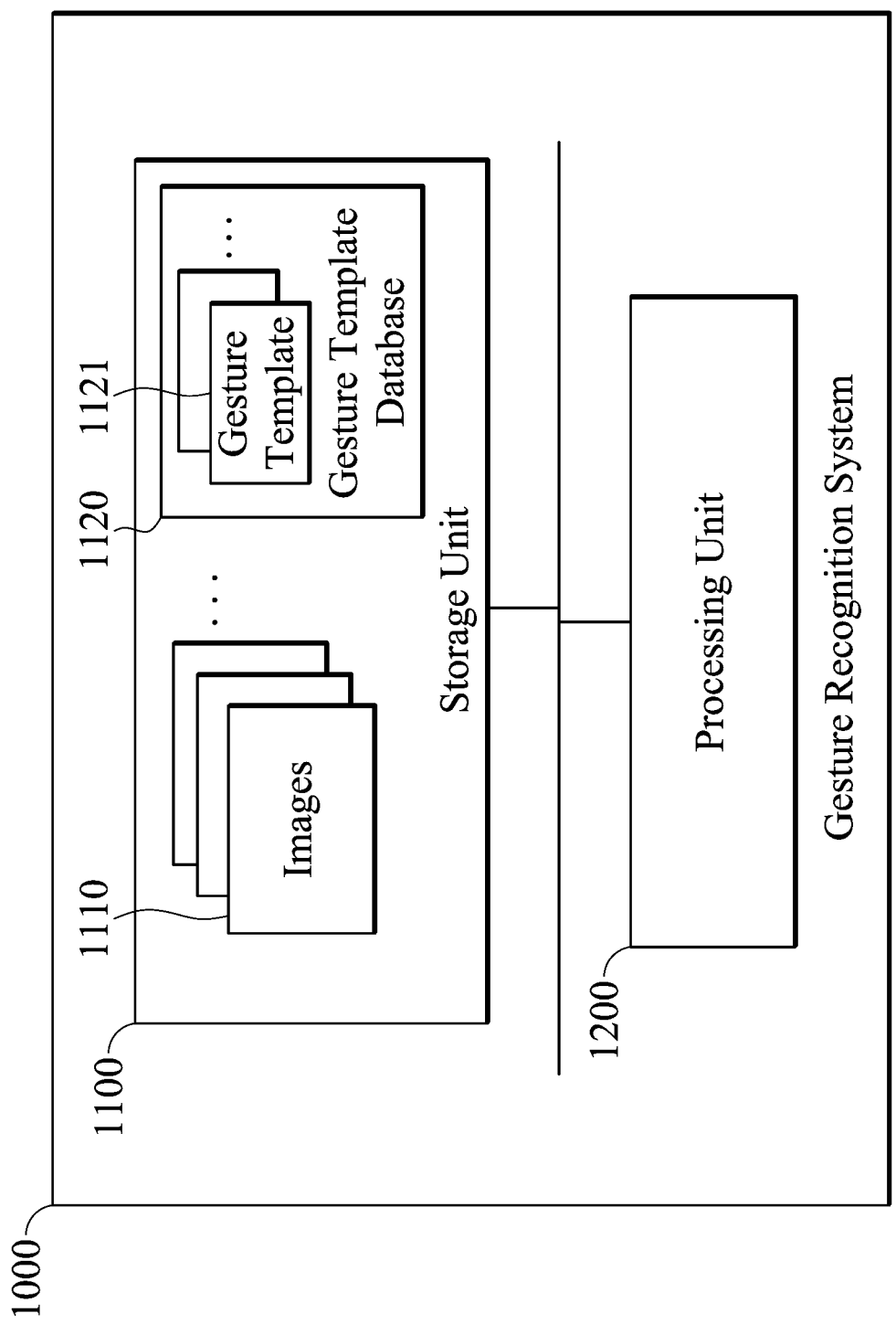
FIG. 1 is a schematic diagram illustrating an embodiment of a gesture recognition system of the disclosure.

FIG. 1 is a schematic diagram illustrating an embodiment of a gesture recognition system of the disclosure. The gesture recognition system 1000 may be a processor-based electronic device, such as a computer.

Figure 2:
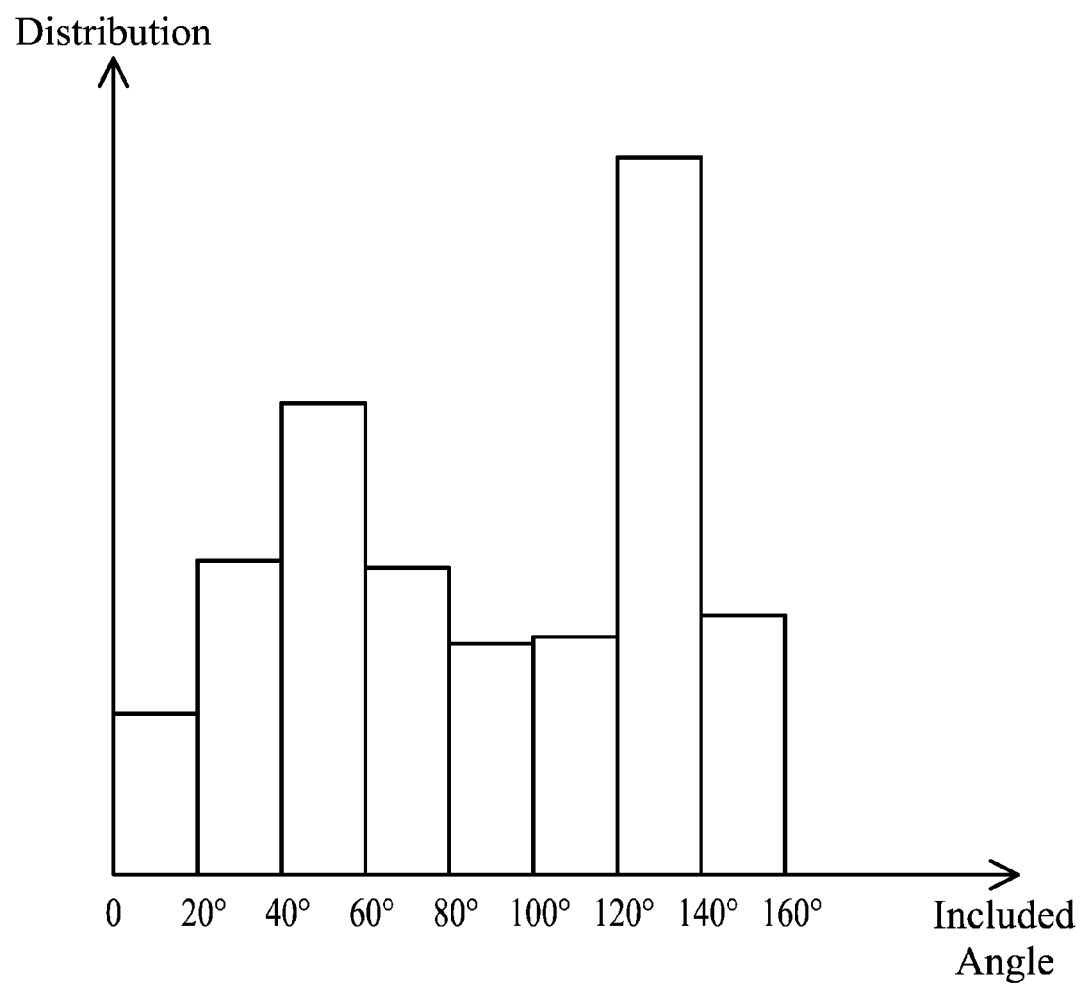
FIG. 2 is a schematic diagram illustrating an embodiment of an example of a histogram representing statistical results of included angles of any two adjacent edges of an object image of the disclosure.

The gesture recognition system 1000 comprises a storage unit 1100 and a processing unit 1200. The storage unit 1100 can comprise a plurality of images 1110 and a gesture template database 1120. It is understood that, in some embodiments, the gesture recognition system 1000 can further comprise an image capture unit (not shown) for obtaining the images 1110. The gesture template database 1120 can comprise a plurality of gesture templates 1121. Each gesture template 1121 defines a first gesture characteristic and a specific gesture corresponding to the first gesture characteristic. A multi-background model can be generated accordingly to the images 1110, and at least one object image including an object can be obtained according to the multi-background model. The object has a plurality of edges. The included angles of any two adjacent edges of the object image are gathered as statistics to obtain a second gesture characteristic corresponding to the object image. In some embodiments, the second gesture characteristic can be represented by a histogram, to record distributions thereof for different included angles, as shown in FIG. 2. The processing unit 1200 performs the gesture recognition method of the disclosure, which will be discussed further in the following paragraphs.

Figure 3:
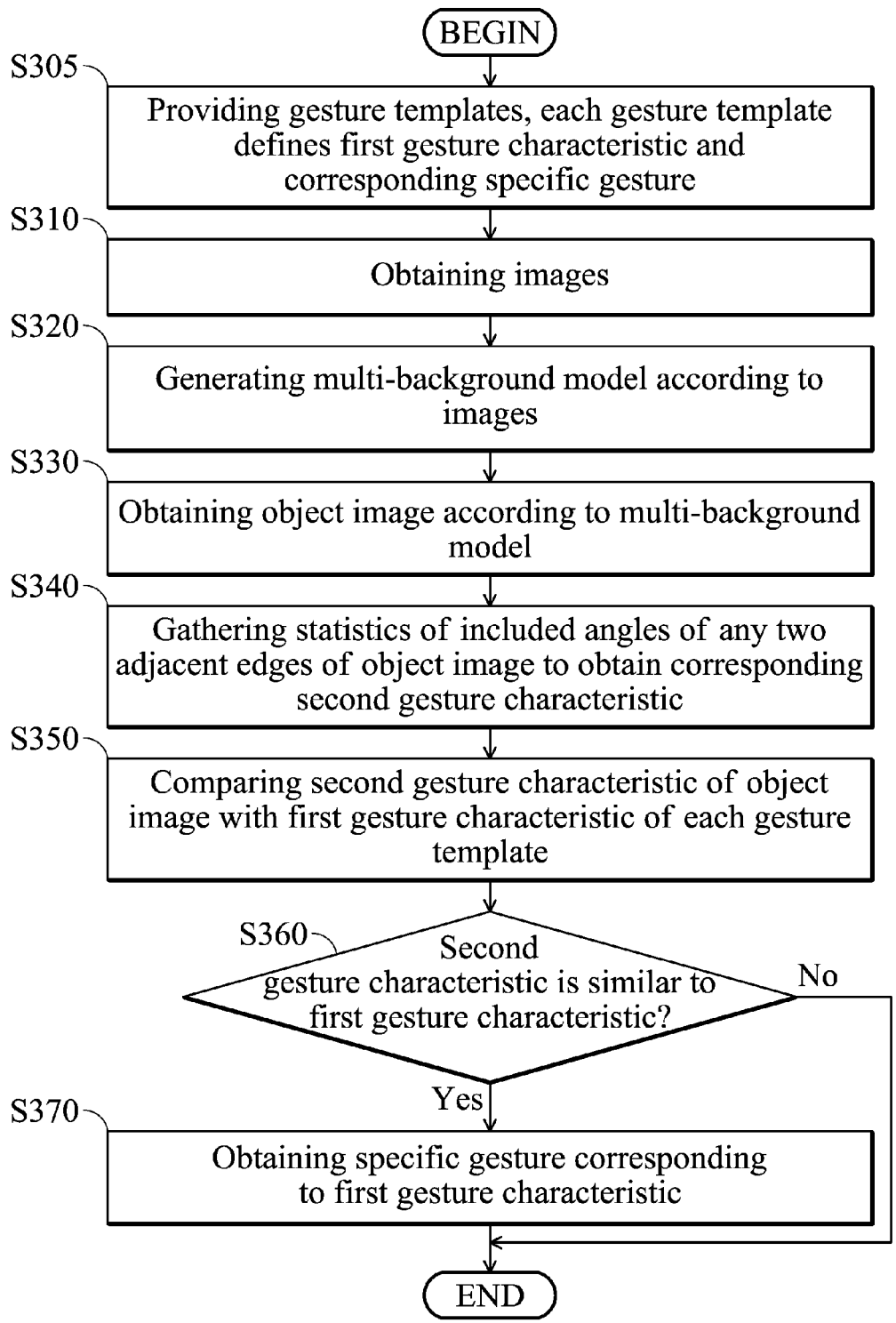
FIG. 3 is a flowchart of an embodiment of a gesture recognition method of the disclosure.

FIG. 3 is a flowchart of an embodiment of a gesture recognition method of the disclosure. The gesture recognition method can be used for a processor-based electronic device, such as a computer.

Figure 4:
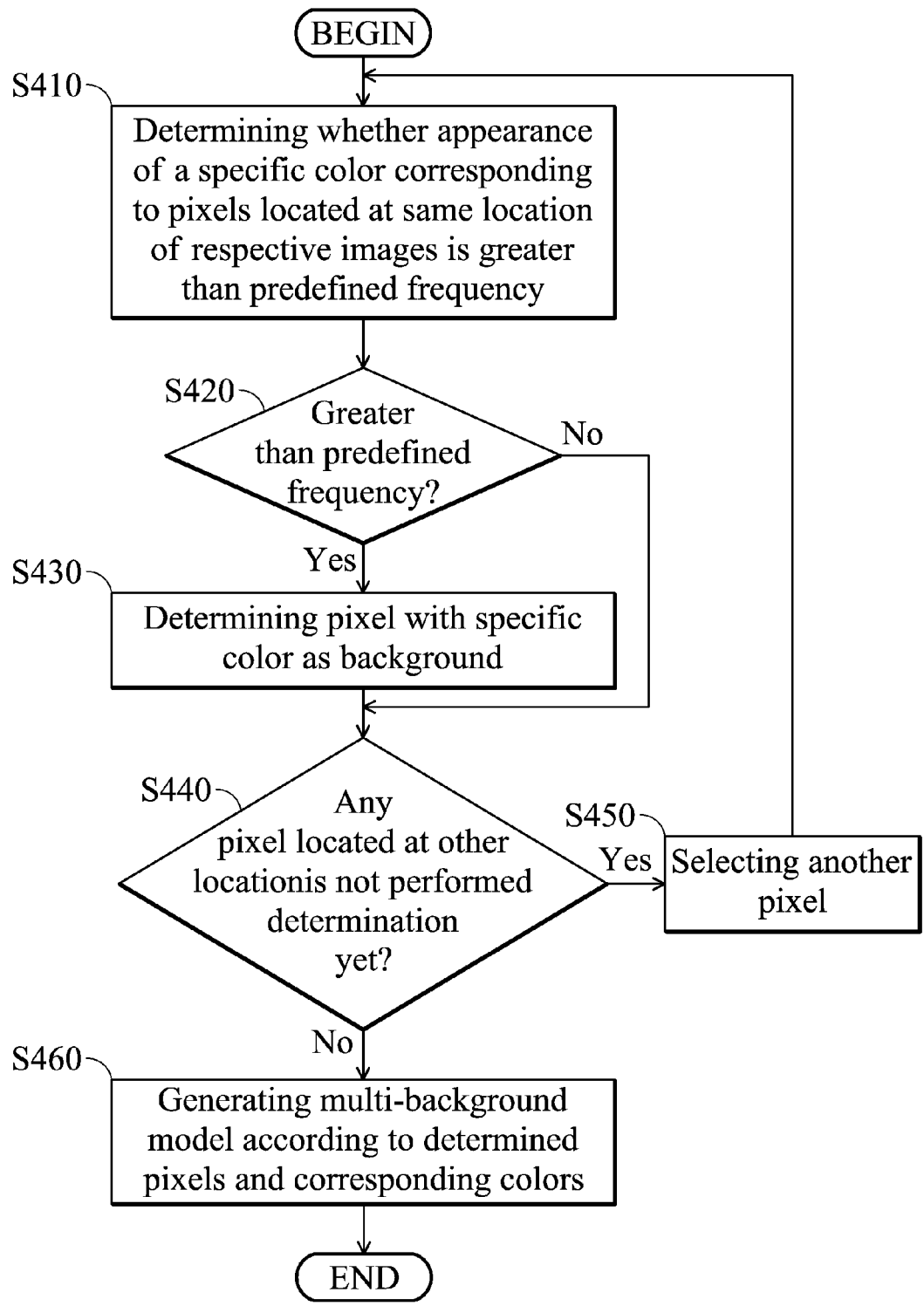
FIG. 4 is a flowchart of an embodiment of a method for generating a multi-background model of the disclosure.

In step S305, a plurality of gesture templates are provided, wherein each gesture template defines a first gesture characteristic and a specific gesture corresponding to the first gesture characteristic. In step S310, a plurality of images are obtained, and in step S320, a multi-background model is generated according to the images. FIG. 4 is a flowchart of an embodiment of a method for generating a multi-background model of the disclosure. It is noted that, each image has a plurality of pixels, and each pixel has at least a color. First, in step S410, for a pixel located at a location of the image, it is determined whether the appearance of a specific color corresponding to the pixels located at the same location of the respective images is greater than a predefined frequency. If the appearance of the specific color corresponding to the pixels located in the same location of the respective images is not greater than the predefined frequency (No in step S420), in step S440, it is determined whether the determination procedure has been performed for any pixel located at other locations of the image. If the determination procedure has not been performed for any pixel located at other locations of the image (Yes in step S440), in step S450, another pixel located at other locations of the image is selected, and the procedure returns to step S410. If the appearance of the specific color corresponding to the pixels located in the same location of the respective images is greater than the predefined frequency (Yes in step S420), in step S430, the pixel is determined as being representative of a part of the background, and in step S440, it is determined whether the determination procedure has not been performed for any pixel located at other locations of the image. If the determination procedure has not been performed for any pixel located at other locations of the image (Yes in step S440), in step S450, another pixel located at other locations of the image is selected, and the procedure returns to step S410. If the determination procedure has been performed for all pixels of the image (No in step S440), in step S460, the multi-background model is generated according to the determined pixels and corresponding colors thereof. After the multi-background model is generated, in step S330, at least one object image is obtained according to the multi-background model and one of the images. That is, the background image is removed from the image. It is noted that, the object image can include at least an object having a plurality of edges. Additionally, in some embodiments, the image after the background image is removed may include several object images. Therefore, a specific object image can be recognized from the object images, and the specific object image can be used for subsequent operations. For example, when the object images comprise a head image and a hand image, the hand image can be recognized from the object images for subsequent operations. Then, in step S340, the included angles of any two adjacent edges of the object image are gathered as statistics to obtain a second gesture characteristic corresponding to the object image. Similarly, as described, the second gesture characteristic may be the statistical result of the included angles of any two adjacent edges corresponding to a gesture image. In some embodiments, the second gesture characteristic can be represented by a histogram, to record the distributions for different included angles. After the second gesture characteristic of the object image is obtained, in step S350, the second gesture characteristic of the object image is compared with the first gesture characteristic of each gesture template. When the second gesture characteristic is not similar to any one of the first gesture characteristics (No in step S360), the procedure is completed. When the second gesture characteristic is similar to one of the first gesture characteristics (Yes in step S360), in step S370, a specific gesture corresponding to the first gesture characteristic is obtained.

It is understood that, in some embodiments, a similarity degree can be respectively calculated for the second gesture characteristic of the object image and the first gesture characteristic of each gesture template. The first gesture characteristic with the highest similarity degree can be selected. Additionally, in some embodiments, in order to increase recognition accuracy, it can be determined whether the similarity degree corresponding to the first gesture characteristic is greater than a predefined threshold. If the similarity degree corresponding to the first gesture characteristic is greater than the predefined threshold, a corresponding recognition result is generated.

It is also understood that, in some embodiments, after the specific gesture corresponding to the object image is recognized, the direction of the object and/or a specific portion of the object in the specific gesture can be also recognized. For example, when the object image is a hand image, the direction of the hand and the location of the fingertips in the specific gesture can be recognized.

Therefore, the gesture recognition method and systems do not need to create a background model in advance, and can dynamically generate a multi-background model, and automatically filter out the background image from an image to obtain at least one object image, wherein a gesture corresponding to the object image is recognized.

Gesture recognition methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. When implemented on a general-purpose processor, the program code combines with the processor to provide a unique apparatus that operates analogously to application specific logic circuits.

While the disclosure has been described by way of example and in terms of preferred embodiment, it is to be understood that the disclosure is not limited thereto. Those who are skilled in this technology can still make various alterations and modifications without departing from the scope and spirit of this invention. Therefore, the scope of the disclosure shall be defined and protected by the following claims and their equivalents.

What is claimed:

1. A method of gesturing recognition executed by a computer, comprising:
providing a plurality of gesture templates, wherein each gesture template defines a first gesture characteristic and a specific gesture corresponding to the first gesture characteristic;
obtaining a plurality of images;
generating a multi-background model according to the images;
obtaining at least one object image according to the multi-background model, wherein the object image includes at least an object having a plurality of edges;
gathering statistics of the included angles of any two adjacent edges of the object image by the computer to obtain a second gesture characteristic corresponding to the object image;
comparing the second gesture characteristic of the object image with the first gesture characteristic of each gesture template; and
when the second gesture characteristic is similar to the first gesture characteristic, obtaining the specific gesture corresponding to the first gesture characteristic.

2. The method of claim 1, wherein each image has a plurality of pixels, each pixel has at least a color, and the generation of the multi-background model comprises the steps of:
for the respective pixel located at a location of the image, determining whether the appearance of a specific color corresponding to the pixels located at the same location of the respective images is greater than a predefined frequency;
determining that the pixel with the specific color as being representative of a part of a background when the appearance of the specific color corresponding to the pixels located at the same location of the respective images is greater than the predefined frequency; and
generating the multi-background model according to the respective pixels determined as being representative of the background and the corresponding colors thereof.

3. The method of claim 1, further comprising:
recognizing a specific object image from the at least one object image; and
calculating the corresponding second gesture characteristic for the specific object image.

4. The method of claim 3, wherein the specific object image comprises a hand image.

5. The method of claim 4, further comprising recognizing direction of a hand and location of fingertips corresponding to the hand image in the specific gesture.

6. The method of claim 1, wherein the second gesture characteristic has a similarity degree with each of the first gesture characteristics, and the highest similarity degree is greater than a predefined threshold.

7. The method of claim 1, wherein the second gesture characteristic is represented using a histogram, and the histogram records the statistical results of included angles of any two adjacent edges of the object image.

8. A gesture recognition system, comprising:
a storage unit storing a plurality of images and a plurality of gesture templates, wherein each gesture template defines a first gesture characteristic and a specific gesture corresponding to the first gesture characteristic; and
a processing unit generating a multi-background model according to the images, obtaining at least one object image according to the multi-background model, wherein the object image includes at least an object having a plurality of edges, gathering statistics of the included angles of any two adjacent edges of the object image to obtain a second gesture characteristic corresponding to the object image, comparing the second gesture characteristic of the object image with the first gesture characteristic of each gesture template, and obtaining the specific gesture corresponding to the first gesture characteristic when the second gesture characteristic is similar to the first gesture characteristic.

9. The system of claim 8, wherein each image has a plurality of pixels, each pixel has at least a color, and for the respective pixel located at a location of the image, the processing unit further determines whether the appearance of a specific color corresponding to the pixels located at the same location of the respective images is greater than a predefined frequency, determines that the pixel with the specific color as being representative of a part of a background when the appearance of the specific color corresponding to the pixels located at the same location of the respective images is greater than the predefined frequency, and generates the multi-background model according to the respective pixels determined as being representative of the background and the corresponding colors thereof.

10. The system of claim 8, wherein the processing unit further recognizes a specific object image from the at least one object image, and calculates the corresponding second gesture characteristic for the specific object image.

11. The system of claim 10, wherein the specific object image comprises a hand image.

12. The system of claim 11, wherein the processing unit further recognizes direction of a hand and location of fingertips corresponding to the hand image in the specific gesture.

13. The system of claim 8, wherein the second gesture characteristic has a similarity degree with each of the first gesture characteristics, and the highest similarity degree is greater than a predefined threshold.

14. The system of claim 8, wherein the second gesture characteristic is represented using a histogram, and the histogram records the statistical results of included angles of any two adjacent edges of the object image.

15. The system of claim 8, further comprising an image capture unit for capturing the images.

16. A machine-readable storage medium comprising a computer program, which, when executed, causes a device to perform a gesture recognition method, wherein the device has a plurality of images and a plurality of gesture templates, wherein each gesture template defines a first gesture characteristic and a specific gesture corresponding to the first gesture characteristic, and the method comprises:
generating a multi-background model according to the images;
obtaining at least one object image according to the multi-background model, wherein the object image includes at least an object having a plurality of edges;
gathering statistics of the included angles of any two adjacent edges of the object image to obtain a second gesture characteristic corresponding to the object image;
comparing the second gesture characteristic of the object image with the first gesture characteristic of each gesture template; and
obtaining the specific gesture corresponding to the first gesture characteristic when the second gesture characteristic is similar to the first gesture characteristic.

* * * * *